United States Patent
Thiessen et al.

(10) Patent No.: US 10,094,477 B2
(45) Date of Patent: Oct. 9, 2018

(54) BUTTERFLY VALVE

(71) Applicant: VAG - Armaturen GmbH, Mannheim (DE)

(72) Inventors: Peter Thiessen, Bobenheim-Roxheim (DE); Torsten Rupp, Wiesloch (DE); Heribert Herold, Mannheim (DE); Jürgen Heyne, Weinheim (DE)

(73) Assignee: VAG - ARMATUREN GMBH, Mannheim, GA (US)

( * ) Notice: Subject to any disclaimer, the term of this patent is extended or adjusted under 35 U.S.C. 154(b) by 0 days.

(21) Appl. No.: 15/266,285

(22) Filed: Sep. 15, 2016

(65) Prior Publication Data

US 2017/0082206 A1 Mar. 23, 2017

(30) Foreign Application Priority Data

Sep. 17, 2015 (DE) ........................ 10 2015 115 671

(51) Int. Cl.
*F16K 1/22* (2006.01)
*F16K 1/32* (2006.01)

(52) U.S. Cl.
CPC .............. *F16K 1/222* (2013.01); *F16K 1/224* (2013.01); *F16K 1/32* (2013.01)

(58) Field of Classification Search
CPC . F16K 1/22; F16K 1/221; F16K 1/222; F16K 1/225; Y10T 137/6055; Y10T 137/0525
USPC ................. 251/305, 308; 137/15.25, 315.24
See application file for complete search history.

(56) References Cited

U.S. PATENT DOCUMENTS

| | | | | |
|---|---|---|---|---|
| 2,412,918 A | * | 12/1946 | Sladky | .................... F16K 1/223 |
| | | | | 137/269 |
| 3,630,485 A | | 12/1971 | Williams | |
| 4,296,915 A | | 10/1981 | Baumann | |
| 4,483,513 A | * | 11/1984 | Summers | .................. F16K 1/22 |
| | | | | 251/308 |
| 4,579,477 A | * | 4/1986 | Hartman | .................. F16B 3/00 |
| | | | | 403/324 |
| 5,350,183 A | * | 9/1994 | Shealy | ..................... B62D 7/18 |
| | | | | 280/93.512 |

(Continued)

FOREIGN PATENT DOCUMENTS

| DE | 936002 | 12/1955 |
|---|---|---|
| DE | 1172902 | 6/1964 |

(Continued)

OTHER PUBLICATIONS

Result of Examination Report for DE 10 2015 115 671.7 filed Sep. 17, 2015.

(Continued)

*Primary Examiner* — Michael R Reid
(74) *Attorney, Agent, or Firm* — Paul D. Bianco; Katharine Davis; Fleit Gibbons Gutman Bongini & Bianco PL

(57) ABSTRACT

A butterfly valve with a valve disk mounted to swivel about an axis of rotation inside a housing and torsionally rigidly connected to a drive shaft pivotably mounted inside the housing. To ensure a connection which, from the standpoint of production engineering, is simple, yet secure, the valve disk is torsionally rigidly connected to the drive shaft by means of a minimum of two tapered pins engaging opposite sides of the drive shaft.

10 Claims, 3 Drawing Sheets

(56) References Cited

U.S. PATENT DOCUMENTS 9,022,348 B2    5/2015  Shu
2012/0248361 A1   10/2012  Fujiyama et al.

FOREIGN PATENT DOCUMENTS

DE    1192894    5/1965
EP    1209390    5/2002

OTHER PUBLICATIONS

Machine English translation of description and claims for DE1172902 translated Sep. 2016.
Machine English translation of description and claims for DE936002 translated Sep. 2016.
Machine English translation of description and claims for DE1192894 translated Sep. 2016.

* cited by examiner

BUTTERFLY VALVE

FIELD OF THE INVENTION

The present invention relates to a butterfly valve.

BACKGROUND

Butterfly valves are shutoff elements widely used in water resources engineering. In contrast to slide gate valves, butterfly valves are extremely compact and, especially in nominal widths larger than DN 300, require considerably less mounting space. Therefore, piping systems with nominal widths from approximately DN 300 are most often equipped with butterfly valves. Butterfly valves generally comprise a valve disk, which is mounted to swivel about an axis of rotation inside a housing and which is torsionally rigidly connected to a drive shaft that is pivotably mounted inside the housing. In the prior art valve disks, the drive shaft is often connected to the valve disk by means of splined shaft couplings or polygon couplings. Although this ensures a secure connection with good force transmission, the manufacture of shaft/hub couplings of this type is complex and, accordingly, entails high costs.

U.S. 2012/0248361 A1 discloses a prior art butterfly valve comprising a valve disk swivel mounted about an axis of rotation inside a housing, and having a disk-shaped valve body and hubs for receiving a drive shaft, which is pivotably mounted inside the housing; and a bearing bolt on the opposite side of the drive shaft. In this prior art butterfly valve, both the drive shaft and the bearing bolt are torsionally rigidly connected to the valve disk by means of a tapered pin.

SUMMARY OF THE INVENTION

In some embodiments, a butterfly valve according to the disclosure makes it possible to connect the drive shaft and the valve disk in a manner that is simple from the standpoint of production technology, yet secure at the same time.

Useful embodiments and advantageous variations of the invention are also disclosed.

In the butterfly valve according to the present invention, the valve disk is torsionally rigidly connected to the drive shaft by means of a minimum of two tapered pins, which engage opposite sides of the drive shaft, with the two oppositely lying tapered pins being disposed on the valve disk. Owing to the tapered pins, it is possible, with simple means, to create an easy-to-install, yet torsion- and blowout-proof connection between the valve disk and the drive shaft. The connection by means of the tapered pins is especially easy to install, since it obviates the need for drilling bores when the valve is assembled, and since the tapered pins allow relatively large tolerances. Using the tapered pins makes it possible to achieve a zero-backlash connection in a simple manner, and settings and adjustments are easy to make as well. Furthermore, since, by means of the tapered pins, the drive shaft is also axially securely held on the valve disk, a blowout-proof connection is ensured.

In an embodiment that is especially advantageous from the standpoint of production engineering, the tapered pins can be configured as cylindrical pins with a sloping wedge face complementary to an inclined chamfer of the drive shaft. Such tapered pins are easy to produce and easy to install. Furthermore, the wedge faces and the complementary chamfers on the drive shaft provide good force transmission, thereby reducing the load on the drive shaft, the valve disk and the pins to a minimum. Instead of cylindrical pins with a sloping wedge face, the tapered pins could also be configured as conical pins.

According to a useful embodiment, the tapered pins can be disposed in bores that extend tangentially with respect to a receiving opening for the drive shaft through a hub of a valve body of the valve disk and which intersect the receiving opening.

The bores for the tapered pins can preferably be configured as blind bores and, starting from a back side of the valve body and extending to the top side of the hub, run at right angles with respect to the axis of rotation of the valve disk. However, the bores for the tapered pins can also be configured as through-bores. Instead of being disposed at right angles with respect to the valve disk, the bores can, however, also extend in the direction of the valve disk.

The valve disk may have only two tapered pins, one lying opposite to the other. However, it is also possible to use more than two tapered pins, which can also be offset with respect to one another in the direction of the axis of rotation.

The bores preferably have internal threads, into which threaded pins with complementary external threads are inserted above the tapered pins. The tapered pins can be inserted and axially secured by means of the threaded pins.

It is also possible to insert additional plugs into the bores above the threaded pins. In this manner, fluid can be prevented from penetrating into the bores and, thus, potential corrosion caused thereby can be avoided. In addition, toward the top, the bores are preferably covered by a retaining ring that is attached to the valve body by means of screws. Owing to the retaining ring, which is also used to retain the gasket, the pin connection is protected against corrosion and cannot be seen from the outside. However, the bores for the tapered pins need not necessarily be disposed under the retaining ring. At larger nominal widths, the bores can also be disposed so as to be inwardly offset with respect to the retaining ring.

BRIEF DESCRIPTION OF THE DRAWINGS

Other special features and advantages of the invention follow from the description of preferred practical examples below based on the drawing. The figures show.

DETAILED DESCRIPTION

Figure 1:
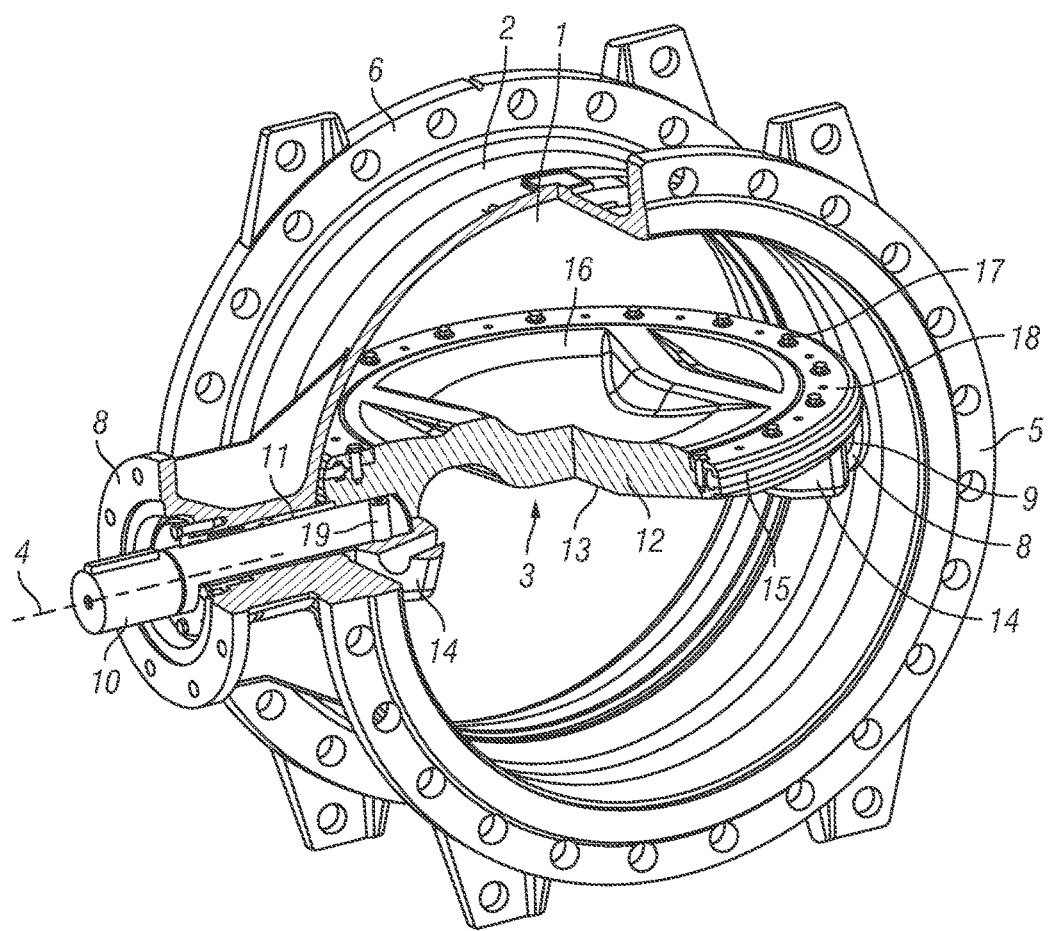
FIG. 1 a butterfly valve with a housing and a valve disk in a partially sectional perspective view.

The butterfly valve schematically represented in FIG. 1 comprises a housing 2 with a round through-opening 1 in which a valve disk 3 is mounted to swivel about an axis of rotation 4 perpendicular with respect to the central axis of the through-opening 1. The ring-shaped housing 2 has anterior and posterior connecting flanges 5 and 6, respectively, so as to be able to connect it to a piping system. In addition, the housing 2 also comprises two oppositely lying mounting flanges 8 in which the valve disk 3 is pivotably mounted by means of a drive shaft 10 and a bearing bolt 9 via bearing bushings 11.

In the embodiment shown, the valve disk 3 is configured to rotate eccentrically and has a disk-shaped valve body 12, which is offset with respect to the axis of rotation 4, and two hubs 14 disposed opposite to each other and projecting beyond a front side 13 of the valve body 12. In addition, the valve disk 3 comprises a ring- or disk-shaped gasket 15 and a retaining ring 18 releasably mounted by means of screws 17 to a back surface 16 of the valve body 12 and by means of which retaining ring the gasket 15 is attached to the valve body 12. The connection between the valve body 12 of the valve disk 3 and the drive shaft 10 is implemented by means of tapered pins 19, which will be explained in greater detail below.

Figure 2:
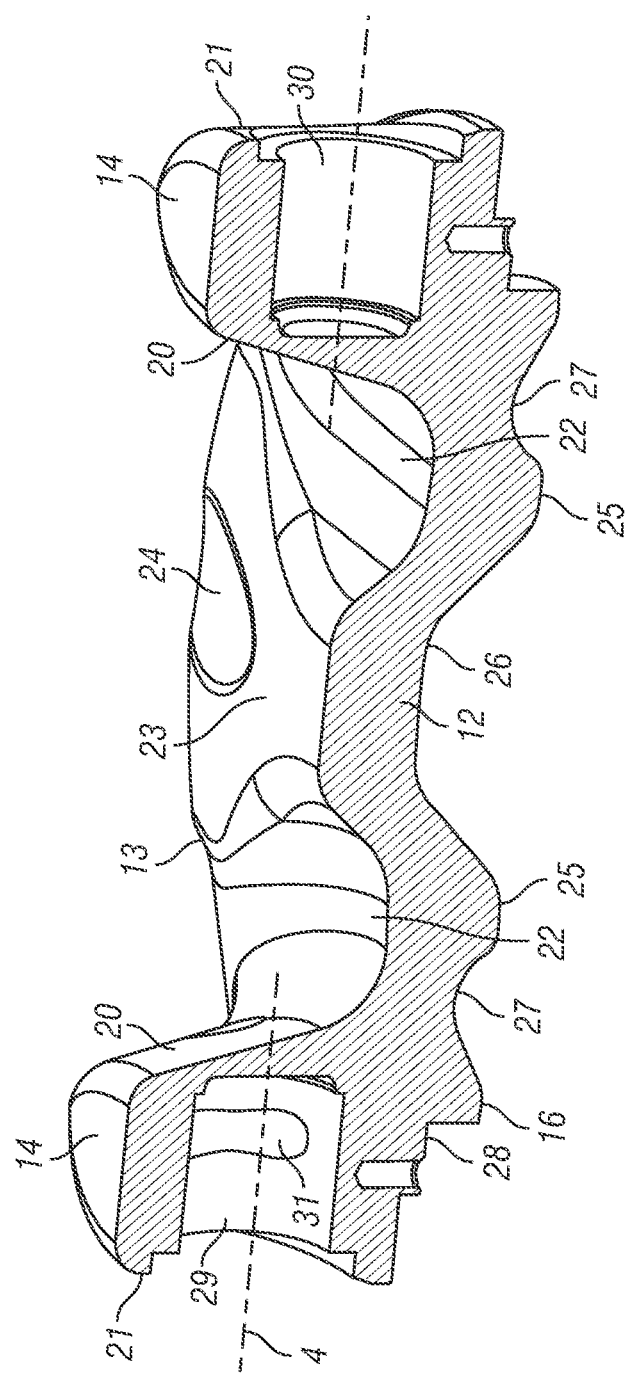
FIG. 2 a valve body of the valve disk shown in FIG. 1 in a sectional view along the axis of rotation.

As FIG. 2 indicates, the hubs 14 projecting beyond the front side 13 of the valve body 12 have convex inside surfaces 20 that face each other. In the embodiment shown, the hubs 14 have an elliptical or bi-convex cross section and, in addition to the convex inside surfaces 20 that face each other, they also have convex outside surfaces 21.

On the front side 13 of the valve body 12, two cavities 22 arcuately extending along the two inside surfaces 20 of the hubs 14 are disposed so as to be able to divert the flow around the hubs 14. The two groove-like cavities 22, which have U-shaped cross sections, are separated from each other by a convexly curved middle bridge-like section 23, which widens on both sides from the middle of the valve body 12 toward the outer sides. Owing to the two arcuately extending cavities 22, flow channels are formed between the two hubs 14, which flow channels divert the flow around the hubs 14. Disposed in the middle bridge-like section 23 are two diametrically oppositely lying recesses 24 which, when seen in plan view, are V-shaped and which extend from the edge of the valve body 12 toward the middle thereof. As a result, when seen in plan view, the contour between the two hubs 14 on the front side of the valve body 12 has the shape of an X. This contour contributes to optimizing the flow and provides reinforcement.

As seen in FIG. 2, the back side 16 of the valve body 12 also has a special contour with arcuate ribs 25, a depression 26 disposed between the ribs 25, and recesses 27 disposed on the back between the ribs 25 and the outer side of the valve body 12. On the front side 13, the ribs 25 are disposed opposite to the cavities 22, while the depression 26 is located opposite to the middle bridge-like section 23 disposed on the front side 13. The width of the depression 26 expands beginning in the middle and extending toward both sides. As a result, the valve body 12, in a cross section extending along the axis of rotation 4 through the two hubs 14, comprises a W-shaped cross-sectional area as can be seen in FIG. 2. To be able to receive the gasket 15 and the retaining ring 18, the valve body 12, on its back side 16, has a stepped cavity with a ring-shaped inside support area 28 for the retaining ring 18.

Disposed in the two hubs 14 are lateral openings 29 and 30 for receiving the drive shaft 10 shown in FIG. 1 and the bearing bolt 9 located on the opposite side of the drive shaft 10. Disposed in the hub 14 with the opening 29 for the drive shaft 10 are bores 31, which extend tangentially with respect to the opening 29, for two tapered pins 19 disposed on opposite sides of the drive shaft 10 so as to torsionally rigidly connect the drive shaft 10 to the valve body 12. As seen in FIG. 2, the bores 31 for the tapered pins 19 are disposed in the hub 14 at right angles with respect to the axis of rotation 4 in such a manner that they partially intersect with the opening 29, thereby allowing the outside of the drive shaft 10, when inserted into the opening 29, to project on two oppositely lying points into the bores 31.

Figure 3:
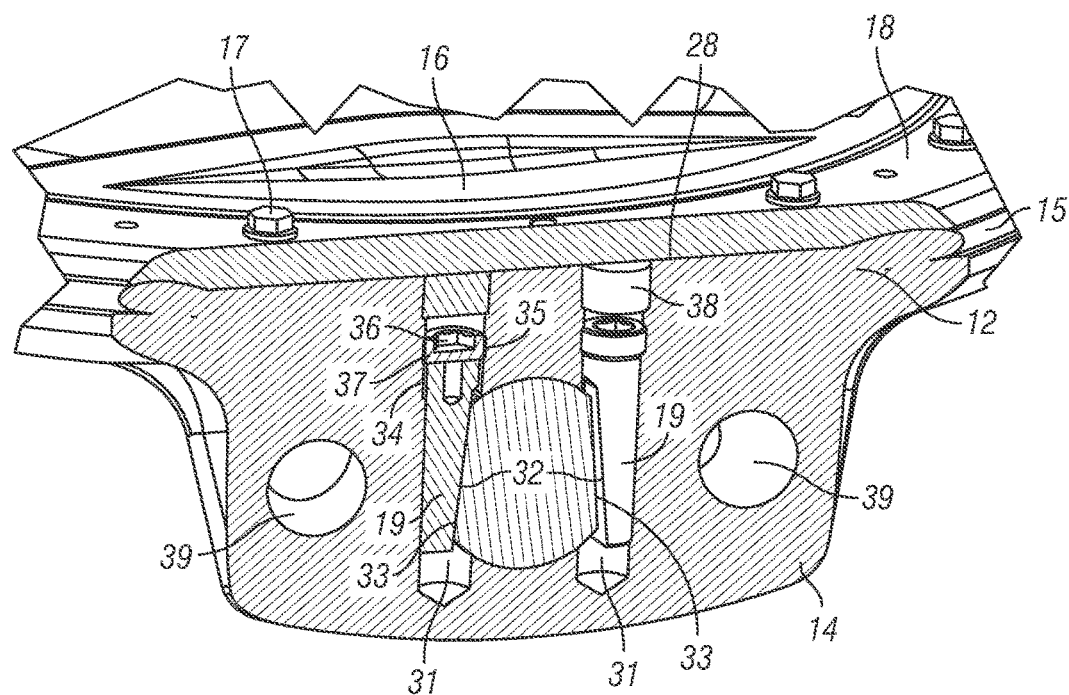
FIG. 3 an enlarged detail view of the area of connection between the valve disk and a drive shaft; and, FIG. 4 a longitudinal section of a tapered pin.

As FIG. 3 indicates, starting from the back side 16 of the valve body 12 and extending to the top side of the hubs 14, the bores 31 are configured as blind bores running at right angles with respect to the axis of rotation 4 of the valve disk 3. The tapered pins 19 disposed in the bores 31 have sloping wedge faces 32 complementary to two inclined chamfers 33 on opposite sides of the drive shaft 10. The bores 31 are here disposed so as to lie opposite to each other and have internal threads 34 into which threaded pins 37, with complementary external threads 35, and hexagonal recesses 36 are inserted. Using the threaded pins 37 inserted above the tapered pins 19, the tapered pins 19 can be axially secured. In addition, above the threaded pins 37, plugs 38, made of rubber or the like, are inserted into the bores 31. In this manner, fluid can be prevented from penetrating into the bores and, thus, potential corrosion caused thereby can be avoided. In addition, toward the tops, the bores 31 are preferably covered by a retaining ring 18 attached to the valve body 12 by means of screws 17. Thus, the pin connection is protected against corrosion and cannot be seen from the outside. The hubs 14 can have holes 39 so as to be able to divert the flow.

Figure 4:
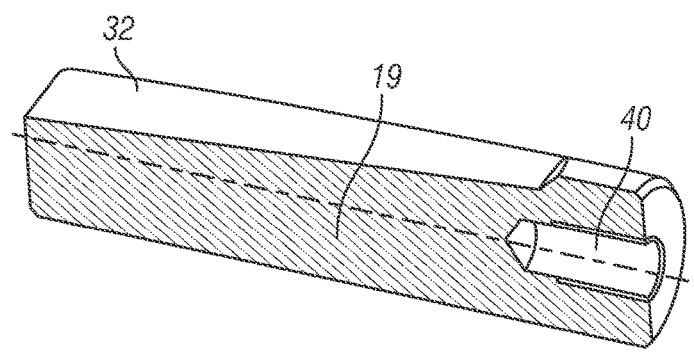

The tapered pins 19 separately shown in a longitudinal section in FIG. 4 are configured as cylindrical pins with an internal thread 40. Thus, the tapered pins 19 are easy to manufacture and, if required, can be easily removed.

What is claimed is:

1. A butterfly valve comprising:
    a housing;
    a valve disk swivel-mounted about an axis of rotation inside the housing; the valve disk including a valve body having a disk shape and two hubs disposed opposite to each other and each projecting beyond a front side of the valve body;
    a drive shaft mounted inside the housing;
    a bearing bolt disposed in the one of the two hubs opposite mounting of the drive shaft;
    a lateral opening in each of the two hubs, a first of the lateral openings for receiving the drive shaft and a second of the lateral openings, opposite the first, for receiving the bearing bolt;
    at least two tapered pins configured for engaging opposite sides of the drive shaft, the at least two tapered pins torsionally, rigidly connecting the valve disk to the drive shaft;
    bores for receiving the at least two tapered pins, the bores extending tangentially through a hub of the two hubs with respect to the lateral opening; and
    a retaining ring attached to the valve body with screws, the retaining ring covering the bores;
    wherein the at least two tapered pins connect the valve disk and the drive shaft.

2. The butterfly valve according to claim 1, wherein the bores are inwardly offset with respect to the retaining ring.

3. The butterfly valve according to claim 1, wherein the at least two tapered pins are cylindrical pins.

4. The butterfly valve according to claim 3, wherein each tapered pin of the at least two tapered pins has a sloping wedge face complementary to an inclined chamfer on the drive shaft.

5. The butterfly valve according to claim 1, wherein the bores are disposed at right angles with respect to the axis of rotation.

6. The butterfly valve according to claim 5, wherein each of the bores begins at a back side of the valve body and extends to a top side of the hub intersecting the lateral opening.

7. The butterfly valve according to claim 1, wherein each of the bores further comprises internal threads.

8. The butterfly valve according to claim 7, further comprising threaded pins configured for insertion into the bores at a position above the at least two tapered pins, each of the threaded pins having external threads complementary to the internal threads of the bores.

9. The butterfly valve according to claim 8, further comprising plugs for preventing fluid from penetrating into the bores, each plug configured for insertion into the bores at a position above the threaded pins.

10. The butterfly valve according to claim 1, wherein each of the at least two tapered pins further comprises an internal thread.

* * * * *

UNITED STATES PATENT AND TRADEMARK OFFICE
CERTIFICATE OF CORRECTION

PATENT NO.         : 10,094,477 B2
APPLICATION NO.    : 15/266285
DATED              : October 9, 2018
INVENTOR(S)        : Peter Thiessen et al.

Page 1 of 1

It is certified that error appears in the above-identified patent and that said Letters Patent is hereby corrected as shown below:

On the Title Page

Item (73) correct the address of the Assignee as follows:
(73) Mannheim, DE

Signed and Sealed this
Second Day of June, 2020

Andrei Iancu
*Director of the United States Patent and Trademark Office*